United States Patent
Tameshige et al.

(10) Patent No.: US 8,434,078 B2
(45) Date of Patent: Apr. 30, 2013

(54) QUICK DEPLOYMENT METHOD

(75) Inventors: Takashi Tameshige, Kawasaki (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/105,163

(22) Filed: May 11, 2011

(65) Prior Publication Data
US 2011/0213939 A1    Sep. 1, 2011

Related U.S. Application Data

(63) Continuation of application No. 12/630,047, filed on Dec. 3, 2009, now Pat. No. 7,958,503, which is a continuation of application No. 11/033,731, filed on Jan. 13, 2005, now Pat. No. 7,653,901.

(30) Foreign Application Priority Data

Dec. 8, 2004    (JP) ................................. 2004-355101

(51) Int. Cl.
*G06F 9/44* (2006.01)
(52) U.S. Cl.
USPC .......................................................... 717/168
(58) Field of Classification Search .................... 717/168
See application file for complete search history.

(56) References Cited

U.S. PATENT DOCUMENTS

| | | | |
|---|---|---|---|
| 7,340,616 B2 * | 3/2008 | Rothman et al. ............... | 713/300 |
| 7,356,679 B1 * | 4/2008 | Le et al. ............................. | 713/1 |
| 7,653,901 B2 | 1/2010 | Tameshige et al. | |
| 8,023,157 B2 * | 9/2011 | Takahashi et al. ............ | 358/3.26 |
| 8,209,680 B1 * | 6/2012 | Le et al. .......................... | 717/174 |
| 2002/0103889 A1 * | 8/2002 | Markson et al. ............... | 709/223 |
| 2002/0120578 A1 | 8/2002 | Sy | |
| 2003/0055919 A1 * | 3/2003 | Fong et al. ...................... | 709/220 |
| 2003/0078959 A1 | 4/2003 | Yeung et al. | |
| 2003/0191911 A1 * | 10/2003 | Kleinschnitz et al. ........ | 711/154 |
| 2003/0220882 A1 | 11/2003 | Rabin et al. | |
| 2004/0054780 A1 | 3/2004 | Romero | |
| 2004/0243630 A1 | 12/2004 | Kanie | |
| 2004/0268340 A1 * | 12/2004 | Steeb et al. ..................... | 717/174 |
| 2005/0010918 A1 * | 1/2005 | Childs et al. ................... | 717/174 |
| 2005/0160150 A1 * | 7/2005 | Kao .............................. | 709/212 |
| 2005/0216911 A1 | 9/2005 | Yen et al. | |

(Continued)

FOREIGN PATENT DOCUMENTS

| JP | 61278902 | 12/1986 |
|---|---|---|
| JP | 01237744 | 9/1989 |
| JP | 2002278769 | 9/2002 |
| JP | 2004110791 | 4/2004 |

OTHER PUBLICATIONS

White et al., "An Integrated Experimental Environment for Distributed Systems and Networks", 2002, ACM.*

*Primary Examiner* — Wei Zhen
*Assistant Examiner* — Junchun Wu
(74) *Attorney, Agent, or Firm* — Brundidge & Stanger, P.C.

(57) ABSTRACT

Provided is a deployment method for a server system that includes a storage system having logical disks where disk images are stored and plural servers connected to the storage system via a storage network, the method including the step of causing a deploy management module to copy the logical disks which store the disk images to a free area of the storage system before a deployment command is received. According to this invention, disk images are quickly deployed to servers.

12 Claims, 22 Drawing Sheets

U.S. PATENT DOCUMENTS

| | | |
|---|---|---|
| 2006/0080656 A1 | 4/2006 | Cain et al. |
| 2006/0123386 A1 | 6/2006 | Tameshige et al. |
| 2008/0162839 A1* | 7/2008 | Nakamichi et al. ........... 711/159 |
| 2010/0077389 A1 | 3/2010 | Tameshige et al. |

* cited by examiner

| SERVER IDENTIFIER | CHASSIS ID | ALLOCATED CPU# | LOGICAL DISK NUMBER | NETWORK CONNECTION PORT | FC CONNECTION PORT |
|---|---|---|---|---|---|
| SERVER 0 | 1 | CPU 0 | LU 0 | 1 | 1 |
| SERVER 1 | 1 | CPU 0 | LU 1 | 2 | 1 |
| SERVER 2 | 1 | CPU 1 | LU 2 | 3 | 2 |
| SERVER 3 | 1 | CPU 2,CPU 3 | LU 3 | 4 | 3 |
| SERVER 4 | 1 | CPU 4,CPU 5 CPU 6,CPU 7 | LU 4 | 5 | 4 |
| SERVER 5 | 2 | CPU 0 | LU 11 | 6 | 5 |
| SERVER 6 | 2 | CPU 1 | LU 12 | 7 | 6 |
| SERVER 7 | 2 | CPU 2 | LU 13 | 8 | 7 |
| - | 2 | CPU 3 | - | 9 | 8 |
| ⋮ | ⋮ | ⋮ | ⋮ | ⋮ | ⋮ |
| MANAGEMENT SERVER | 10 | CPU 0 | BUILT-IN DISK | 10 | 10 |

CPU-LU ALLOCATION MANAGEMENT TABLE

FIG. 7

| SERVER IDENTIFIER | CHASSIS ID | ALLOCATED CPU# | LOGICAL DISK NUMBER | NETWORK CONNECTION PORT | FC CONNECTION PORT |
|---|---|---|---|---|---|
| SERVER 0 | 1 | CPU 0 | LU 0 | 1 | 1 |
| SERVER 1 | 1 | CPU 0 | LU 1 | 2 | 1 |
| SERVER 2 | 1 | CPU 1 | LU 2 | 3 | 2 |
| SERVER 3 | 1 | CPU 2,CPU 3 | LU 3 | 4 | 3 |
| SERVER 4 | 1 | CPU 4,CPU 5 CPU 6,CPU 7 | LU 4 | 5 | 4 |
| SERVER 5 | 2 | CPU 0 | LU 11 | 6 | 5 |
| SERVER 6 | 2 | CPU 1 | LU 12 | 7 | 6 |
| SERVER 7 | 2 | CPU 2 | LU 13 | 8 | 7 |
| SERVER 8 | 2 | CPU 3 | LU 14 | 9 | 8 |
| ⋮ | ⋮ | ⋮ | ⋮ | ⋮ | ⋮ |
| MANAGEMENT SERVER | 10 | CPU 0 | BUILT-IN DISK | 10 | 10 |

CPU-LU ALLOCATION MANAGEMENT TABLE AFTER SCALE-OUT

FIG. 8

| SERVER IDENTIFIER | CHASSIS ID | ALLOCATED CPU# | LOGICAL DISK NUMBER | NETWORK CONNECTION PORT | FC CONNECTION PORT |
|---|---|---|---|---|---|
| SERVER 0 | 1 | CPU 0 | LU 0 | 1 | 1 |
| SERVER 1 | 1 | CPU 0 | LU 1 | 2 | 1 |
| SERVER 2 | 1 | CPU 1 | LU 2 | 3 | 2 |
| SERVER 3 | 1 | CPU 2, CPU 3 | LU 3 | 4 | 3 |
| SERVER 4 | 1 | CPU 4, CPU 5 CPU 6, CPU 7 | LU 4 | 5 | 4 |
| SERVER 5 | 2 | CPU 0 | LU 11 | 6 | 5 |
| SERVER 6 | 2 | CPU 1 | LU 12 | 7 | 6 |
| SERVER 7 | 2 | CPU 2, CPU 3 | LU 13 | 8 | 7 |
|  |  |  |  | 9 | 8 |
| ⋮ | ⋮ | ⋮ | ⋮ | ⋮ | ⋮ |
| MANAGEMENT SERVER | 10 | CPU 0 | BUILT-IN DISK | 10 | 10 |

CPU-LU ALLOCATION MANAGEMENT TABLE AFTER SCALE-UP

FIG. 9

| 701 | 702 | 703 | 704 |
| --- | --- | --- | --- |
| LOGICAL DISK NUMBER | IMAGE NAME | PRIORITY | CAPACITY[GB] |
| LU 0 | IMAGE 0 | - | 10.0 |
| LU 1 | IMAGE 1 | - | 10.0 |
| LU 2 | IMAGE 2 | - | 20.5 |
| LU 3 | IMAGE 3 | - | 20.5 |
| LU 4 | IMAGE 4 | - | 10.0 |
| LU 5 | IMAGE 0 | 1 | 10.0 |
| LU 6 | IMAGE 0 | 4 | 10.0 |
| LU 7 | IMAGE 0 | 5 | 10.0 |
| LU 8 | IMAGE 1 | 2 | 10.0 |
| LU 9 | IMAGE 2 | 3 | 20.5 |
| LU 10 | IMAGE 2 | 6 | 20.5 |
| ⋮ | ⋮ | ⋮ | ⋮ |
| 705 — TOTAL USED CAPACITY (CURRENT UTILIZATION VALUE [USED CAPACITY VALUE INCLUDING COPIES] ) | | | 71.0 [510.0] |
| 706 — FREE CAPACITY (CURRENT FREE CAPACITY VALUE [FREE CAPACITY VALUE INCLUDING COPIES] ) | | | 441.0 [2.0] |

LU MANAGEMENT TABLE 502

FIG. 10

| SERVER IDENTIFIER | OS TYPE | | | MIDDLE WARE TYPE | | | APPLICATION TYPE | | |
|---|---|---|---|---|---|---|---|---|---|
| | OS1 | OS2 | OS3 | MW1 | MW2 | MW3 | App1 | App2 | App3 |
| SERVER 0 | 1 | 0 | 0 | 1 | 0 | 0 | 0 | 0 | 0 |
| SERVER 1 | 1 | 0 | 0 | 1 | 0 | 0 | 0 | 0 | 0 |
| SERVER 2 | 0 | 1 | 0 | 0 | 1 | 0 | 2 | 0 | 0 |
| SERVER 3 | 0 | 1 | 0 | 0 | 1 | 0 | 2 | 0 | 0 |
| SERVER 4 | 0 | 0 | 1 | 0 | 0 | 1 | 0 | 0 | 0 |
| SERVER 5 | 1 | 0 | 0 | 0 | 0 | 0 | 0 | 0 | 1 |
| SERVER 6 | 1 | 0 | 0 | 0 | 0 | 0 | 0 | 0 | 1 |
| SERVER 7 | 1 | 0 | 0 | 0 | 0 | 0 | 0 | 0 | 1 |
| ⋮ | ⋮ | ⋮ | ⋮ | ⋮ | ⋮ | ⋮ | ⋮ | ⋮ | ⋮ |
| TOTAL | 20 | 10 | 5 | 20 | 10 | 5 | 30 | 5 | 15 |
| UNUSED LICENSE | 40 | 20 | 10 | 20 | 20 | 5 | 30 | 20 | 5 |

LICENSE MANAGEMENT TABLE

FIG. 12

| IMAGE NAME | CONTENTS | | | PATCH REVISION |
|---|---|---|---|---|
| | OS | Middle ware | Application | |
| IMAGE 0 | OS 0 | MW 0 | - | po0-0, po0-1<br>pm0-0, pm0-1, pm0-2 |
| IMAGE 1 | OS 0 | MW 1 | - | po0-0, po0-1<br>pm1-0 |
| IMAGE 2 | OS 0 | - | App 0 | po0-0, po0-1<br>pa0-0, pa0-1, pa0-2, pa0-3 |
| IMAGE 3 | OS 1 | - | App 0 | pa0-0, pa0-1, pa0-2, pa0-3 |
| IMAGE 4 | OS 2 | - | - | po2-0, po2-1, po2-2, po2-3 |
| ⋮ | ⋮ | ⋮ | ⋮ | ⋮ |

1101 1102 1103

902
PATCH MANAGEMENT TABLE

FIG. 13

| MANAGEMENT NUMBER (1104) | TYPE (1105) | PATCH REVISION (1106) |
|---|---|---|
| 0 | OS0 | po0-0 |
| 1 | OS0 | po0-1 |
| 2 | OS2 | po2-0 |
| 3 | OS2 | po2-1 |
| 4 | OS2 | po2-2 |
| 5 | OS2 | po2-3 |
| 6 | MW0 | pm0-0 |
| 7 | MW0 | pm0-1 |
| 8 | MW0 | pm0-2 |
| 9 | MW1 | pm1-0 |
| 10 | App0 | pa0-0 |
| 11 | App0 | pa0-1 |
| 12 | App0 | pa0-2 |
| 13 | App0 | pa0-3 |
| ⋮ | ⋮ | ⋮ |

903

PATCH REVISION MANAGEMENT TABLE

*FIG. 14*

| IMAGE NAME | COPY TIMING [NUMBER OF REMAINING COPIES] |
|---|---|
| IMAGE 0 | 5 |
| IMAGE 1 | 10 |
| IMAGE 2 | 5 |
| IMAGE 3 | 5 |
| ⋮ | ⋮ |

1201 — IMAGE NAME
1202 — COPY TIMING [NUMBER OF REMAINING COPIES]

IMAGE CREATION POLICY TABLE 506

COPY TIMING UPDATE POLICY TABLE 508

| IMAGE NAME (1204) | OBTAINED INFORMATION TYPE (1205) | COPY TIMING SET VALUE (1206) | | | |
|---|---|---|---|---|---|
| IMAGE 0 | CPU UTILIZATION RATE [%] | 0-50 | 50-80 | 80-100 | |
| | COPY TIMING [NUMBER OF REMAINING COPIES] | 2 | 5 | 10 | |
| IMAGE 1 | CPU UTILIZATION RATE [%] | 0-30 | 30-80 | 80-90 | 90-100 |
| | COPY TIMING [NUMBER OF REMAINING COPIES] | 2 | 5 | 10 | 15 |
| ... | ... | | | | |

QUICK DEPLOYMENT METHOD

CROSS-REFERENCED TO RELATED APPLICATIONS

The present application is a continuation of application Ser. No. 12/630,047, filed Dec. 3, 2009 now U.S. Pat. No. 7,958,503; which is a continuation of application Ser. No. 11/033,731, filed Jan. 13, 2005, now U.S. Pat. No. 7,653,901; which claims priority from Japanese application P2004-355101 filed on Dec. 8, 2004, the content of which is hereby incorporated by reference into this application.

BACKGROUND OF THE INVENTION

This invention relates to a deployment method by which software is made usable by a server. More specifically, the invention relates to a quick deployment technique.

Known techniques of running plural servers include one in which an OS (Operating System) is introduced to each of plural blade servers or rackmount servers and one in which a server is logically divided to manage many hardware resources and software resources in a centralized manner.

In adding a server to a blade server system, an OS has to be deployed in the server to be added.

A conventional technique of deploying an OS in a server is now described. A blade server system backs up a hard disk where a currently operating OS is stored. Then a master disk is created from the hard disk storing the OS lacking disk-specific information, and the created master disk is copied to another disk. The thus backed-up information is returned to the hard disk storing the OS. In this way, the blade server system prepares the master disk in advance.

The created master disk lacks disk-specific information. The disk-specific information includes a computer name, network-related information, and the like. When a deployment request is made, the blade server system copies the master disk to a local disk of the relevant server via an IP (Internet Protocol) network such as Ethernet. Disk-specific information is set to the local disk to which the master disk is copied, thereby completing the deployment.

The master disk may contain disk-specific information. In this case, the disk-specific information contained in the master disk is rewritten, after the master disk is copied, by a dedicated program to set new disk-specific information.

This conventional technique takes time to finish deployment since a copy is made via an IP network. Furthermore, many copies are necessary to create in advance a master disk lacking disk-specific information, which puts a huge burden on the administrator of the system.

Some blade server systems to solve these problems have been known (see JP 2002-278769 A, for example). A blade server system of this type has a master disk that handles plural OSs. A request to deploy one of the OSs starts copying of the master disk, via FC (Fiber Channel), to a logical disk in a disk array system that is connected to the relevant server.

SUMMARY OF THE INVENTION

The blade server system according to JP 2002-278769 A starts copying the master disk to a logical disk after a deployment request is made, and takes time to finish deployment although not as much as a system using an IP network does.

It is therefore an object of this invention to provide a quick deployment method for a server system.

According to an embodiment of this invention, there is provided a deployment method for a server system that includes a storage system having logical disks where disk images are stored and plural servers connected to the storage system via a storage network, the method including processing of causing a deploy management module to copy the logical disks which store the disk images to a free area of the storage system before a deployment command is received.

This invention makes it possible to deploy quickly an operating system or the like in a server system. This invention also improves ROI through effective use of free areas in storage systems which are idle resources.

BRIEF DESCRIPTION OF THE DRAWINGS

FIG. 7 is a configuration diagram of a CPU-LU allocation management table in the LU management module according to the first embodiment of this invention.

FIG. 8 is a configuration diagram of a CPU-LU allocation management table in the LU management module after scale-out according to the first embodiment of this invention.

FIG. 9 is a configuration diagram of the CPU-LU allocation management table in the LU management module after scale-up according to the first embodiment of this invention.

FIG. 10 is a configuration diagram of an LU management table in the LU management module according to the first embodiment of this invention.

FIG. 12 is a configuration diagram of a license management table in the LU management module according to the first embodiment of this invention.

FIG. 13 is a configuration diagram of a patch management table in the LU management module according to the first embodiment of this invention.

FIG. 14 is a configuration diagram of a patch revision management table in the LU management module according to the first embodiment of this invention.

FIG. 15 is a configuration diagram of an image creation policy table in the LU management module according to the first embodiment of this invention.

FIG. 16 is a configuration diagram of a copy timing update policy table in the LU management module according to the first embodiment of this invention.

DETAILED DESCRIPTION OF THE PREFERRED EMBODIMENTS

Embodiments of this invention will be described below with reference to the accompanying drawings.
(First Embodiment)

Figure 1:
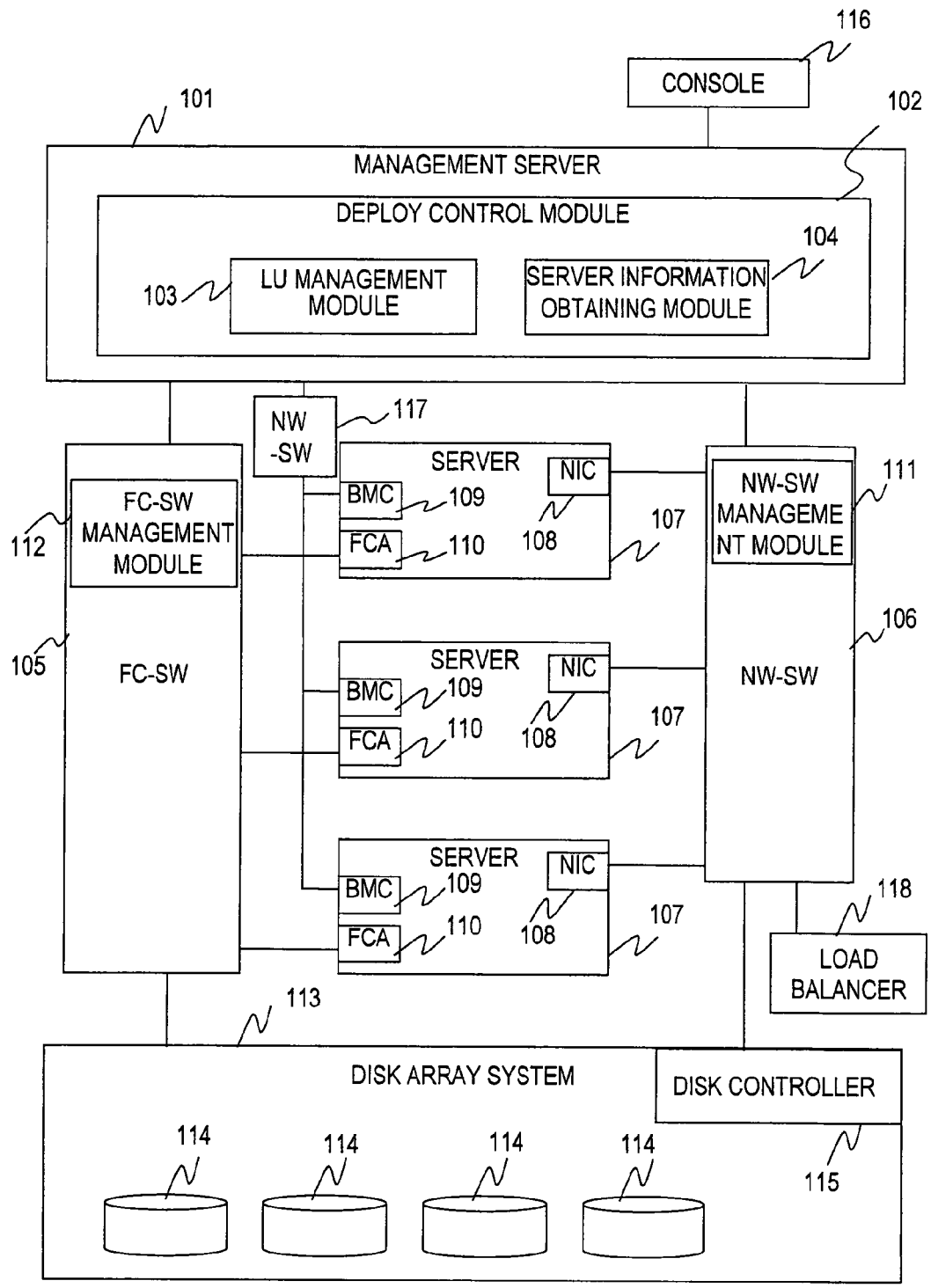
FIG. 1 is a block diagram showing the configuration of a blade server system according to a first embodiment of this invention.

FIG. 1 is a block diagram showing the configuration of a blade server system according to a first embodiment of this invention.

The blade server system is composed of plural servers 107, 107, 107 . . . , which are mounted to a rack or the like, a fiber channel switch (FC-SW) 105, network switches (NW-SWs) 106 and 117, which connect each server 107 to a client computer (omitted from the drawing), a disk array system 113, which has plural logical disks, a console 116, and a load balancer 118.

There are three servers 107, 107 and 107 in FIG. 1 but the blade server system can have any number of servers as long as the number is more than one. Each server 107 has a network interface card (NIC) 108, a BMC (Baseboard Management Controller) 109 and a fiber channel adapter (FCA) 110.

The FC-SW 105 is provided with an FC-SW management module 112. The FC-SW management module 112 monitors the state of the FC-SW 105 (for failure and load of ports, for example) to control the entire FC-SW 105. The FC-SW 105 is connected to the FCA 110 of the server 107, to a management server 101, and to the disk array system 113. This enables the server 107 to access the disk array system 113 via the FC-SW 105. The management server 101 controls the FC-SW management module 112 to manage the configuration of the disk array system 113 and the like. An SAN (Storage Area Network) is built centered around the FC-SW 105.

The NW-SW 106 is provided with an NW-SW management module 111. The NW-SW management module 111 monitors the state of the NW-SW 106 to control the entire NW-SW 106. The NW-SW 106 is connected to the NIC 108 of the server 107, to the management server 101, to the disk array system 113, and to the load balancer 118.

The load balancer 118 distributes the load of the server 107. An IP network is built centered around the NW-SW 106.

The NW-SW 117 is connected to the BMC 109 of the server 107 and to the management server 101. The management server 101 accesses the BMC 109 via the NW-SW 117 to perform hardware status monitoring, power source control, and resetting on the server 107. The BMC 109 is connected to a power source that is different from the one to which the server 107 is connected. This enables the management server 101 to perform hardware status monitoring, power source control, and resetting on the server 107 while the server 107 is shut down.

The disk array system 113 contains logical disks (LUs) 114 and a disk controller 115. The LUs 114 store data inputted from the servers 107, 107, 107 . . . , and the like. The disk controller 115 controls data inputted to and data outputted from the LUs 114. Although FIG. 1 shows one disk array system 113, there may be plural disk array systems. In the case where more than one disk array system 113 is provided, an identifier is given to each disk array system 113 so that one is discriminated from another.

The console 116 is connected to the management server 101. When the console 116 receives a deployment request, a disk copy request or the like, the console 116 sends the inputted request to the management server 101.

The management server 101 monitors the state of the server 107, the NW-SW 106, the FC-SW 105, and the disk array system 113 to control these components. The management server 101 has a deploy control module 102. The deploy control module 102 may instead be placed in the disk controller 115.

The deploy control module 102 is composed of an LU management module 103 and a server information obtaining module 104. The LU management module 103 manages contents stored in the LUs 114 as well as the LUs 114 itself. The LU management module 103 also manages licenses and patches related to contents stored in the LUs 114. The term "contents" refers to an OS (Operating System), middleware, an application and the like. Managing the LUs 114 itself means to copy or delete the LUs 114.

The server information obtaining module 104 obtains hardware information and software information of each server 107 and sends the obtained information to the LU management module 103.

Figure 2:
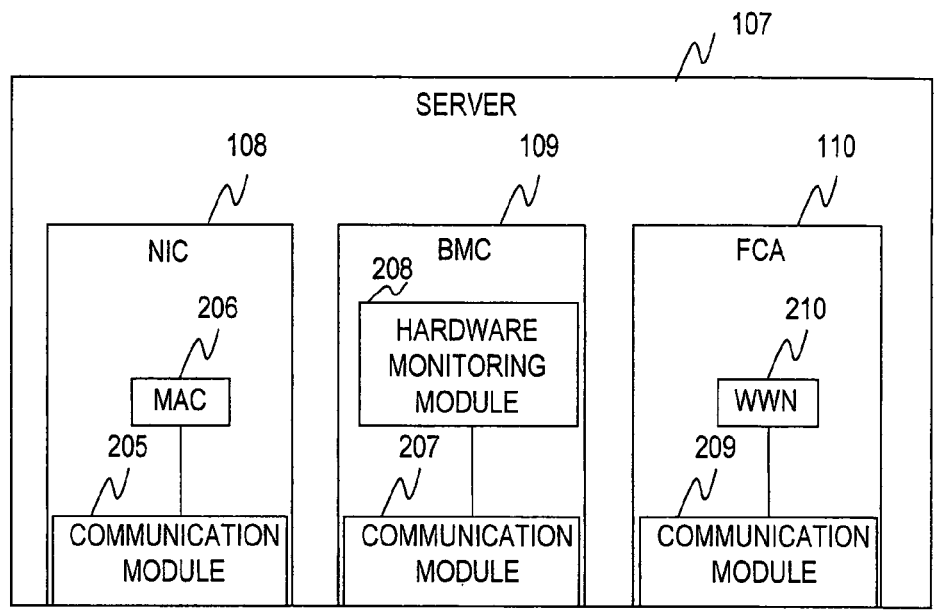
FIG. 2 is a block diagram showing a hardware configuration of the server according to the first embodiment of this invention.

FIG. 2 is a block diagram showing a hardware configuration of the server 107 according to the first embodiment of this invention.

The server 107 has the NIC 108, the BMC 109 and the FCA 110. The NIC 108 has a communication module 205 and MAC 206. The communication module 205 communicates with an external device. The MAC 206 is a memory such as a ROM or EEPROM to store an MAC (Media Access Control) address. The MAC address is a value unique worldwide, thus enabling an external device to identify the NIC 108.

The BMC 109 has a communication module 207 and a hardware monitoring module 208. The communication module 207 communicates with an external device. The hardware monitoring module 208 obtains information on hardware mounted to the server 107. Information on hardware includes inventory information and failure information. The management server 101 receives, from the communication module 207, hardware information obtained by the hardware monitoring module 208.

The FCA 110 has a communication module 209 and WWN 210. The communication module 209 communicates with an external device. The WWN 210 is a memory to store a WWN (World Wide Name). The WWN is a value unique worldwide, thus enabling an external device to identify the FCA 110.

Figure 3:
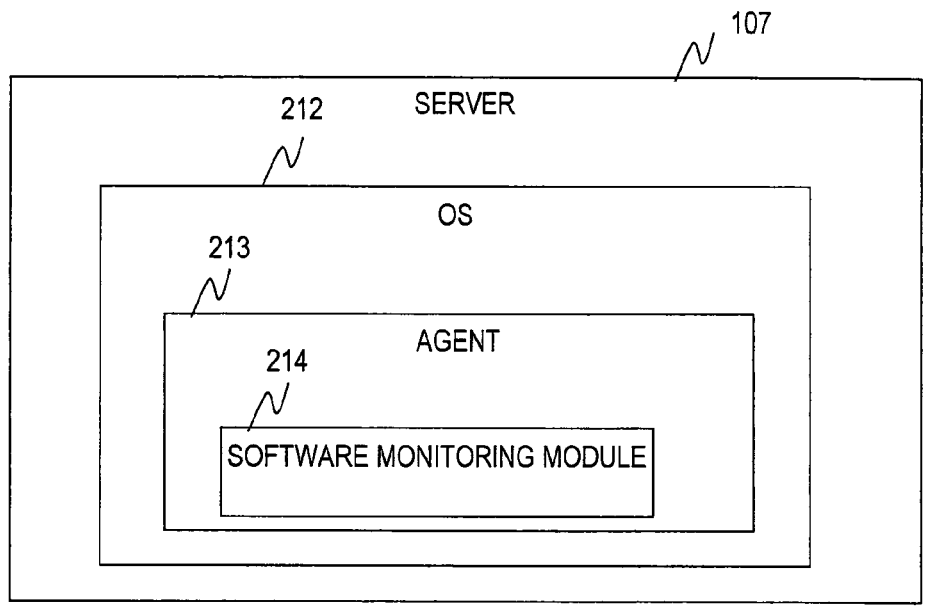
FIG. 3 is a block diagram showing a software configuration of the server according to the first embodiment of this invention.

FIG. 3 is a block diagram showing a software configuration of the server 107 according to the first embodiment of this invention.

The server 107 contains an OS 212. The OS 212 controls the entire server 107. An agent 213 operates on the OS 212. The agent 213 contains a software monitoring module 214 to execute various kinds of processing automatically.

The software monitoring module 214 collects software information and sends the collected software information to the server information obtaining module 104 in the management server 101. Software information includes load information and information obtained by the OS 212. Load information is the number of requests made to an application, or the like. Information obtained by the OS 212 includes software-originated error, the CPU utilization rate, the memory utilization rate, the disk utilization rate, and the like.

Figure 4:
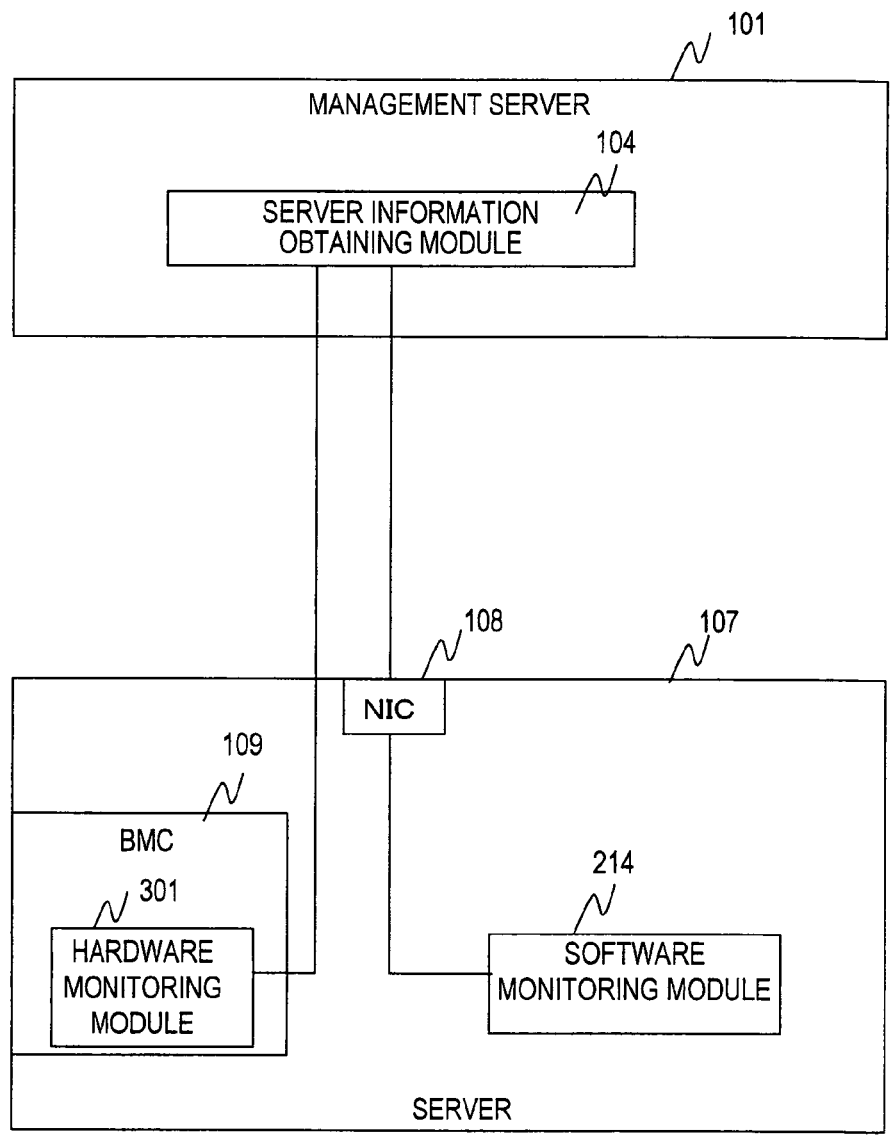
FIG. 4 is an explanatory diagram of communications between the management server and the server in the first embodiment of this invention.

FIG. 4 is an explanatory diagram of communications between the management server 101 and the server 107 in the first embodiment of this invention.

The hardware monitoring module 208 of the BMC 109 in the server 107 sends hardware information to the server information obtaining module 104 in the management server 101. The software monitoring module 214 in the server 107 sends, via the NIC 108, software information to the server information obtaining module 104 in the management server 101.

The server information obtaining module 104 sends the received hardware information and software information (server information) to the LU management module 103 shown in FIG. 1. The LU management module 103 copies or deletes the LUs 114 in the disk array system 113 based on the received server information.

Figure 5:
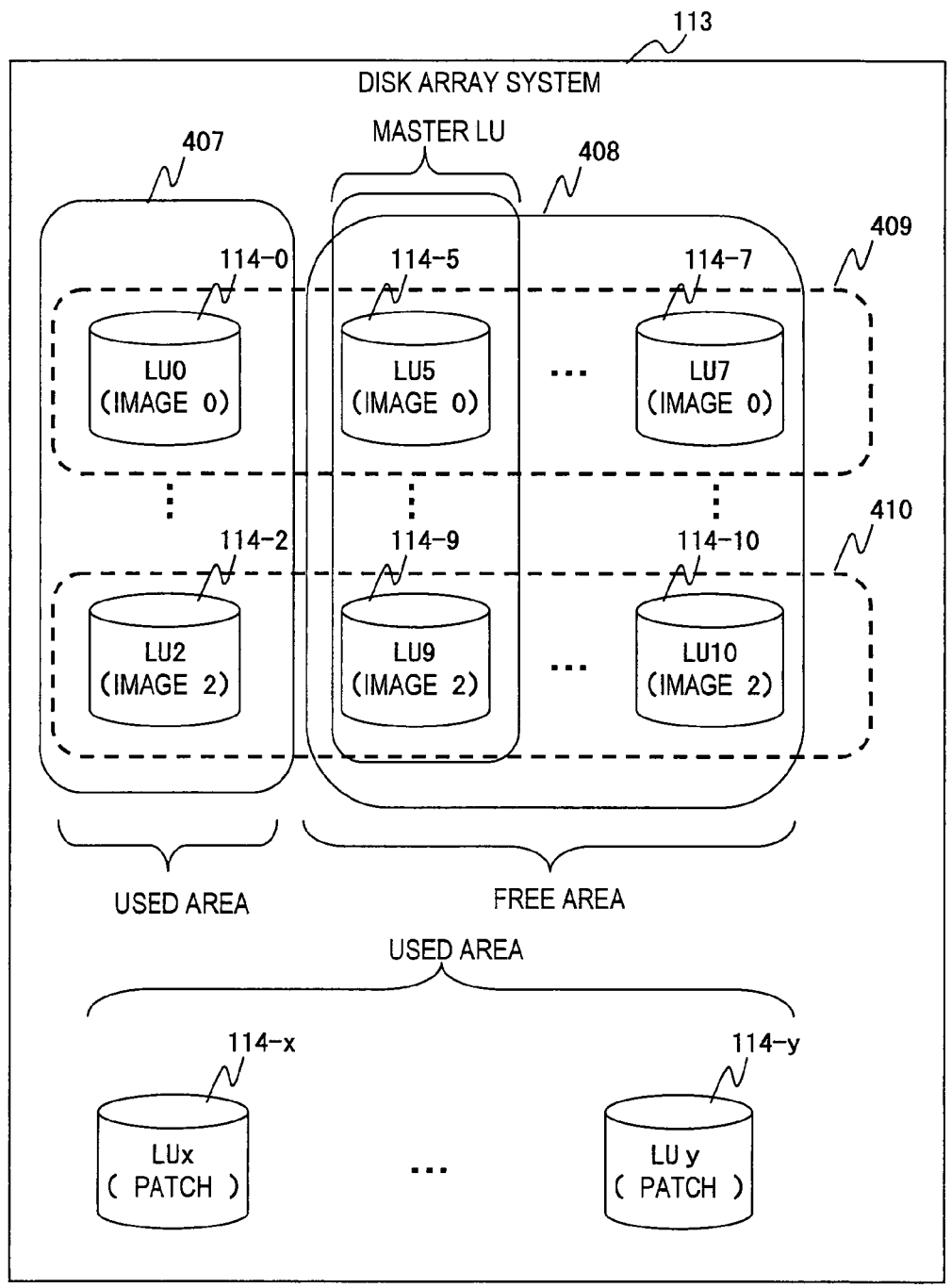
FIG. 5 is an explanatory diagram of LUs in a disk array system according to the first embodiment of this invention.

FIG. 5 is an explanatory diagram of the LUs 114 in the disk array system 113 according to the first embodiment of this invention.

The explanatory diagram shows characteristics of the LUs 114 in the disk array system 113 of this embodiment.

The storage area of the disk array system 113 consists of a used area 407 and a free area 408. The used area 407 contains an LU0 (114-0) and an LU2 (114-2), which are already allocated to the server 107, and an LUx (114-x) and an LUy (114-y), where patches are stored.

The LU0 (114-0) and the LU2 (114-2) are already allocated to the server 107, and each stores an image. For instance, the LU0 (114-0) stores an "image 0" whereas the LU2 (114-2) stores an "image 2". An image contains one or more contents such as an OS, middleware or an application. Images having identical contents are treated as different images when different versions or different patches are employed.

The LUx (114-x) and the LUy (114-y) store patches different from each other.

In prior art, the free area 408, which corresponds to the storage area of the disk array system 113 minus the used area 407, is unused.

In the disk array system 113 of this embodiment, plural LUs (114-0 and others) are prepared by copying to store each image. The area to be created copies may be the entire of or a part of the free area 408.

For instance, copies of the LU0 (114-0), which stores the "image 0", are an LU5 (114-5) and an LU7 (114-7) whereas copies of the LU2 (114-2), which stores the "image 2", are an LU9 (114-9) and an LU10 (114-10). The free area 408 is managed by the LU management module 103 in the management server 101.

The number of LUs (e.g., 114-5) copied from an LU (114-0 or the like) that stores an image is varied depending on the contents of the image, the capacity of the free area 408, server information and other factors, and may differ from one image to another. For instance, 5 copies are created for the LU0 (114-0), which stores the "image 0" while 10 copies are created for the LU2 (114-2), which stores the "image 2".

A group of LUs 114 that store the same image is referred to as an image group 409 and an image group 410. In this example, the LU0 (114-0), the LU5 (114-5) and the LU7 (114-7), which store the "image 0", constitute the image group 409 whereas the LU2 (114-2), the LU9 (114-9) and the LU10 (114-10), which store the "image 2", constitute the image group 410.

The LUs (114-5 and like others) that are created in the free area 408 by copying are each given a priority level in accordance with server information and contents contained in the image. Low priority LUs (114-7 and the like) are deleted to make portions of the free area 408 that are occupied by the low priority LUs (114-7 and the like) free for new information to be stored in the disk array system 113.

Therefore, high priority LUs (114-5 and the like) are not deleted until the free area 408 becomes very small. In this embodiment, at least one LU (114-5 or the like) out of each image group is given a high priority. The LU5 (114-5) and the LU9 (114-9), which have the highest priority level in their respective image groups 409 and 410, may be viewed as master LUs according to JP 2002-278769 A.

The difference is that the disk array system 113 in this embodiment makes plural copies of an LU (114-0 or the like) that stores an image in advance in the free area 408. This enables the management server 101 to deploy an image upon request by merely allocating to the relevant server 107 an LU (114-5 or the like) that has been created in advance by copying. For instance, when requested to deploy the "image 0", the management server 101 allocates to the relevant server 107 the LU7 (114-7), which has the lowest priority level out of the LUs that store the "image 0" (the LU0 (114-0), the LU5 (114-5) and the LU7 (114-7)).

As has been described, the blade server system of this embodiment makes quick deployment possible through effective use of the free area 408.

Figure 6:
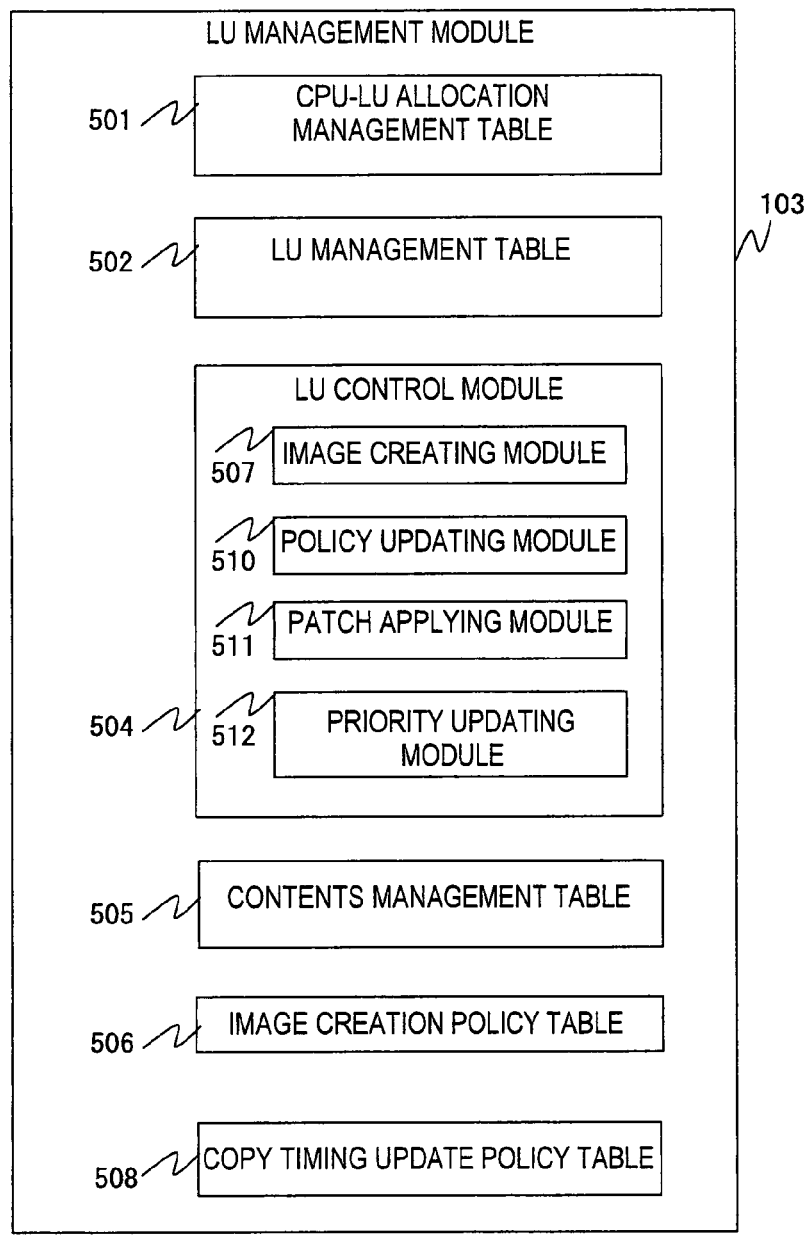
FIG. 6 is a block diagram showing a configuration of an LU management module that the management server has in the first embodiment of this invention.

FIG. 6 is a block diagram showing the configuration of the LU management module 103 that the management server 101 has in the first embodiment of this invention.

The LU management module 103 is provided with a CPU-LU allocation management table 501, an LU management table 502, an LU control module 504, a contents management table 505, an image creation policy table 506 and a copy timing update policy table 508.

The CPU-LU allocation management table 501 manages the servers 107, 107, 107 . . . as will be described later with reference to FIG. 7. The LU management table 502 manages the LUs 114 as will be described later with reference to FIG. 10.

The LU control module 504 sets, when requested to deploy an image, a path from one of the LUs 114 that store the requested image to the relevant server 107, and then sets server-specific information. Server-specific information is composed of network-related information, a computer name, a host name and others.

The LU control module 504 contains an image creating module 507, a policy updating module 510, a patch applying module 511 and a priority updating module 512.

The image creating module 507 copies the LUs 114 that store images. The policy updating module 510 updates the image creation policy table 506. The patch applying module 511 applies a patch to contents contained in an image. The priority updating module 512 sets an order of priority to the LUs 114 that are created through copying by the image creating module 507.

The contents management table 505 manages, as will be described later with reference to FIG. 11, contents contained in an image. The image creation policy table 506 shows as will be described later with reference to FIG. 15, timing at which the LUs 114 are copied by the image creating module 507. The copy timing update policy table 508 shows, as will be described later with reference to FIG. 16, conditions that cause the policy updating module 510 to change the image creation policy table 506.

Having the above-described configuration, the LU management module 103 is capable of quickly deploying contents that have been copied in advance.

The LU management module 103 manages contents licenses, thereby making it possible to avoid producing more copies than the number of licenses and to notify a user (or administrator) of an excess or shortage of license. The blade server system of this embodiment thus can make most of software resources.

FIG. 7 is a configuration diagram of the CPU-LU allocation management table 501 in the LU management module 103 according to the first embodiment of this invention.

The CPU-LU allocation management table 501 contains a server identifier 601, a chassis ID 602, an allocated CPU 603, a logical disk number 604, a network connection port number 605 and an FC connection port number 606.

The server identifier 601 is a unique identifier to identify each server 107. For instance, a serial number is employed as the server identifier 601.

In the case where the server 107 is a blade server, a slot number serves as the server identifier 601. In the case where the server 107 is obtained by logical partitioning, a logical partition name serves as the server identifier 601.

The chassis ID 602 is a unique identifier to identify a chassis that houses the server 107 in question. In the case where the server identifier 601 is a slot number, the server 107 is identified by the server identifier 601 and the chassis ID 602. The chassis ID 602 is not necessary when the server 107 can be identified by the server identifier 601 alone.

The allocated CPU 603 is a unique identifier to identify a CPU allocated to the server 107 in question. In the case where the server 107 has an SMP (Symmetric Multiple Processor) configuration, plural values are registered in the allocated CPU 603. For instance, an SMP configuration with a "CPU 2" and a "CPU 3" is applied to a "server 3".

In the case where the server 107 has a logical partitioning function, the same value is registered in plural records of the allocated CPU 603. With the logical partitioning function, a hardware resource is logically divided to run plural OSs in one hardware resource. For example, a "server 0" and a "server 1" operate in a single "CPU 0".

The logical disk number 604 is a unique identifier to identify one of the LUs 114 to which a path is set from the server 107 in question. The LU to which the path is set serves as a boot disk of this server 107. Each server 107 has its own boot disk and therefore different LUs 114 have to be allocated to different servers 107, 107, 107 . . . . Paths to the LUs 114 are set by the management server 101.

The network connection port number 605 is a unique identifier to identify a network connection port used by the server 107 in question. In the case where the blade server system employs a virtual network (VLAN), an identifier of a VLAN to which a network connection port belongs serves as the network connection port number 605.

FC connection port number 606 is a unique identifier to identify a connection port (FC connection port) of the FC-SW 606 that the server in question uses. In the case where the blade server system employs virtualization such as zoning, an identifier of a group to which an FC connection port belongs serves as the FC connection port number 606.

FIG. 8 is a configuration diagram of the CPU-LU allocation management table 501 after scale-out in the LU management module 103 according to the first embodiment of this invention.

The CPU-LU allocation management table 501 in FIG. 8 shows the blade server system of FIG. 7 when a "server 8" is added. To elaborate, the "server 8" is entered as the server identifier 601 and "LU14" is registered as the logical disk number 604 of this record. Scale-out of the blade server system is conducted in this manner. The term "scale-out" refers to allocating a new server as the server 107.

FIG. 9 is a configuration diagram of the CPU-LU allocation management table 501 after scale-up in the LU management module 103 according to the first embodiment of this invention. The term "scale-up" refers to enhancing or adding a function module of the server 107.

The CPU-LU allocation management table 501 in FIG. 9 shows the blade server system of FIG. 7 when an SMP configuration is given to a CPU of a "server 7". To elaborate, in the record where the "server 7" is written in the field of the server identifier 601, "9" is added as the network connection port number 605 and "8" is added as the FC connection port number 606. Scale-up of the blade server system is thus achieved by giving a desired server 107 an SMP configuration.

FIG. 10 is a configuration diagram of the LU management table 502 in the LU management module 103 according to the first embodiment of this invention.

The LU management table 502 contains a logical disk number 701, an image name 702, a priority 703, a capacity 704, a total used capacity 705 and free capacity 706.

The logical disk number 701 is a unique identifier assigned for identification to each of the LUs 114 in the disk array system 113. The image name 702 is a name to identify an image stored in the LU that is identified by the logical disk number 701. Each image contains one or more contents. The priority 703 is a priority given to this LU. Only those LUs 114 that are not allocated to any server 107 have the priority 703. The LUs 114 that are not allocated to any server 107 are there just for future deployment requests and accordingly can be deleted any time. When storing service data or the like causes a shortage of storage capacity, the disk array system 113 consults the priority 703 to delete the LUs 114 that are not allocated to any server 107 in the order of ascending priorities. The disk array system 113 frees a portion of the free area 408 in this manner and a necessary storage area can always be obtained.

On the other hand, the LUs 114 that are allocated to the servers 107, 107, 107 . . . are not given an order of priority, so "–(check)" is registered as the priority 703. The symbol "–" is written as the priority 703 also for LUs 114 that are to be deployed programmatically. This prevents the system from deleting those LUs 114 and makes programmatic deployment possible.

The capacity 704 is the capacity of the LU that is identified by the logical disk number 701. When there is a shortage of storage area, the LU control module 504 determines how many of the LUs 114 is to be deleted by obtaining the capacity 704.

The total used capacity 705 is a used capacity of the storage area in the disk array system 113. Stored as the total used capacity 705 are a currently used capacity value and a used capacity value including copies.

The term "currently used capacity value" refers to the sum of the capacity 704 of the LUs 114 that are allocated to the servers ("–" is stored as the priority 703). The currently used capacity value therefore agrees with the capacity of the used area 407 shown in FIG. 5. The term "used capacity value including copies" refers to the sum of the capacity of all the LUs 114. The used capacity value including copies therefor includes the capacity of the LUs 114 in the free area 408 that are created by copying as shown in FIG. 5.

The free capacity 706 is an unused capacity of the storage area in the disk array system 113. Stored as the free capacity 706 are a current free capacity value and a free capacity value including copies. The current free capacity value is a value obtained by subtracting the currently used capacity value from the total storage capacity of the disk array system 113, and agrees with the free capacity viewed from a user. The free capacity value including copies is a value obtained by subtracting the currently used capacity value including copies from the total storage capacity of the disk array system 113, and indicates the actual free capacity of the disk array system 113.

Figure 11:
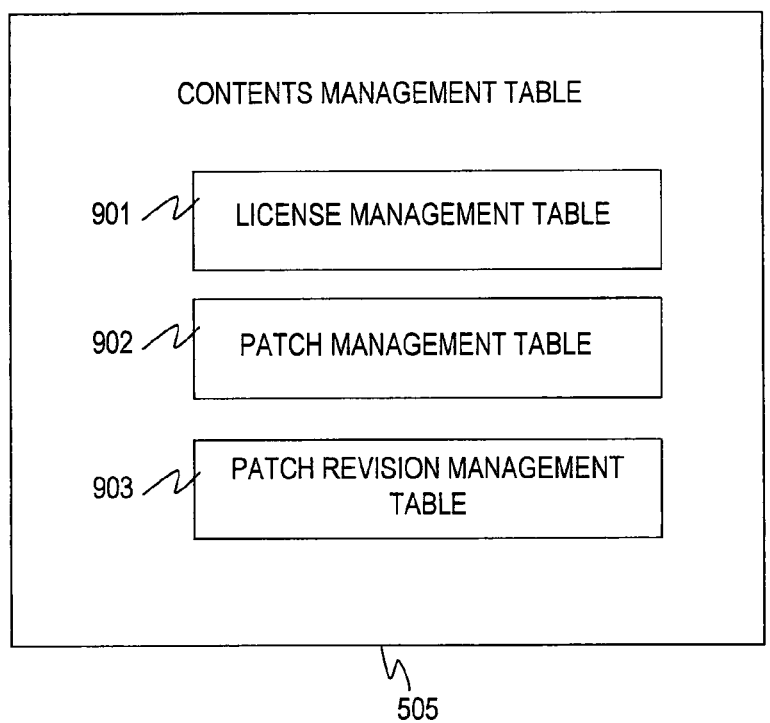
FIG. 11 is a block diagram showing a configuration of a contents management table in the LU management module according to the first embodiment of this invention.

FIG. 11 is a block diagram showing the configuration of the contents management table 505 in the LU management module 103 according to the first embodiment of this invention.

The contents management table 505 contains a license management table 901, a patch management table 902 and a patch revision management table 903.

The license management table 901 manages, as will be described later with reference to FIG. 12, licenses of contents for each server 107. The patch management table 902 manages, as will be described later with reference to FIG. 13, contents contained in each image and others. The patch revision management table 903 manages, as will be described later with reference to FIG. 14, the association between each of contents and a patch.

FIG. 12 is a configuration diagram of the license management table 901 in the LU management module 103 according to the first embodiment of this invention.

The license management table 901 contains a server identifier 1001, an OS type 1002, a middleware type 1003 and an application type 1004.

The server identifier 1001 is a unique identifier to identify each server 107. The OS type 1002 indicates the type of an OS assigned to the server 107 identified by the server identifier 1001 and the number of licenses of the OS. The middleware type 1003 indicates the type of middleware assigned to this server 107 and the number of licenses of the middleware. The application type 1004 indicates the type of an application assigned to this server 107 and the number of licenses of the application. FIG. 12 shows, for exemplification purposes, three types of OS, three types of middleware, and three types of application as the OS type 1002, the middleware type 1003, and the application type 1004, but types are not limited to these.

A total 1005 is the number of licenses distributed to the blade server system. An unused license 1006 indicates the number of licenses that are not used in any server 107.

Having the license management table 901, the LU management module 103 can manage licenses when deploying an OS or the like. In other words, with the blade server system of this embodiment, there is no fear of accidentally committing a license infringement and, furthermore, when to add a software resource can be estimated. Also, software resources can be used effectively by collecting unused licenses. Another advantage is that usage-based billing for a software resource can be applied to the blade server system of this embodiment.

FIG. 13 is a configuration diagram of the patch management table 902 in the LU management module 103 according to the first embodiment of this invention.

The patch management table 902 contains an image name 1101, contents 1102 and a patch revision 1103.

The image name 1101 is a unique name to identify each image stored in the LUs 114. The contents 1102 indicate contents contained in an image identified by the image name 1101. The patch revision 1103 indicates a revision of a patch applied to this image.

Having the patch management table 902, the LU management module 103 can manage contents contained in each image and whether a patch is applied to an image or not. The LU management module 103 uses the patch management table 902 to retrieve the LUs 114 that store images to which no patch is applied, and updates the contents of the retrieved LUs 114.

FIG. 14 is a configuration diagram of the patch revision management table 903 in the LU management module 103 according to the first embodiment of this invention.

The patch revision management table 903 contains a management number 1104, a type 1105 and a patch revision 1106.

The management number 1104 is a unique identifier to identify the record in question. The type 1105 indicates a contents type. The patch revision 1106 indicates a revision of a patch applied to the contents in question.

FIG. 15 is a configuration diagram of the image creation policy table 506 in the LU management module 103 according to the first embodiment of this invention.

The image creation policy table 506 contains an image name 1201 and copy timing 1202.

The image name 1201 is a unique name to identify each image stored in the LUs 114. The copy timing 1202 indicates the timing at which the image identified by the image name 1201 is copied. Specifically, the image creating module 507 starts copying the LU that stores the image identified by the image name 1201 when the number of copies of this LU becomes smaller than the number indicated by the copy timing 1202.

Having the image creation policy table 506, the LU management module 103 can make as many copies of the LUs 114 as the levels of importance of images stored in the LUs 114 dictate.

FIG. 16 is a configuration diagram of the copy timing update policy table 508 in the LU management module 103 according to the first embodiment of this invention. The term "copy timing" refers to the timing of copying the respective images.

The copy timing update policy table 508 contains an image name 1204, an obtained information type 1205 and a copy timing set value 1206.

The image name 1204 is a unique name to identify each image stored in the LUs 114. The obtained information type 1205 indicates the type of information the server information obtaining module 104 obtains from the server 107. The copy timing set value 1206 indicates copy timing that corresponds to the value of the obtained information.

To give an example, the "image 0" is entered as the image name 1204 and the "CPU utilization rate" is registered as the obtained information type 1205. Here, the CPU utilization rate is the mean value of the CPU utilization rate of every server 107 to which the LUs 114 that store the image of the record in question are allocated.

In the copy timing update policy table 508, the copy timing of the "image 0" is set in accordance with the "CPU utilization rate". When the CPU utilization rate of the relevant servers 107, 107, 107 . . . is "0~50%", the policy updating module 510 sets the copy timing 1202 of the image creation policy table 506 to "2". Similarly, when the CPU utilization rate of the relevant servers 107, 107, 107 . . . is "50~80%", the copy timing 1202 of the image creation policy table 506 is set to "5".

The copy timing update policy table 508 may be composed of plural tables which are prepared for each obtained information type 1205. In this case, the policy updating module 510 chooses the largest value out of copy timing values determined in the respective tables, and sets the chosen value as the copy timing 1202 of the image creation policy table 506.

Having the copy timing update policy table 508, the LU management module 103 can change the number of copies of the LUs 114 to be made to suite the service type, the computing resource operation rate, or the like. This enables the LU management module 103 to deal with a case where it is difficult to predict, such as scale-out for the server 107 that has experienced a load surge.

Figure 17:
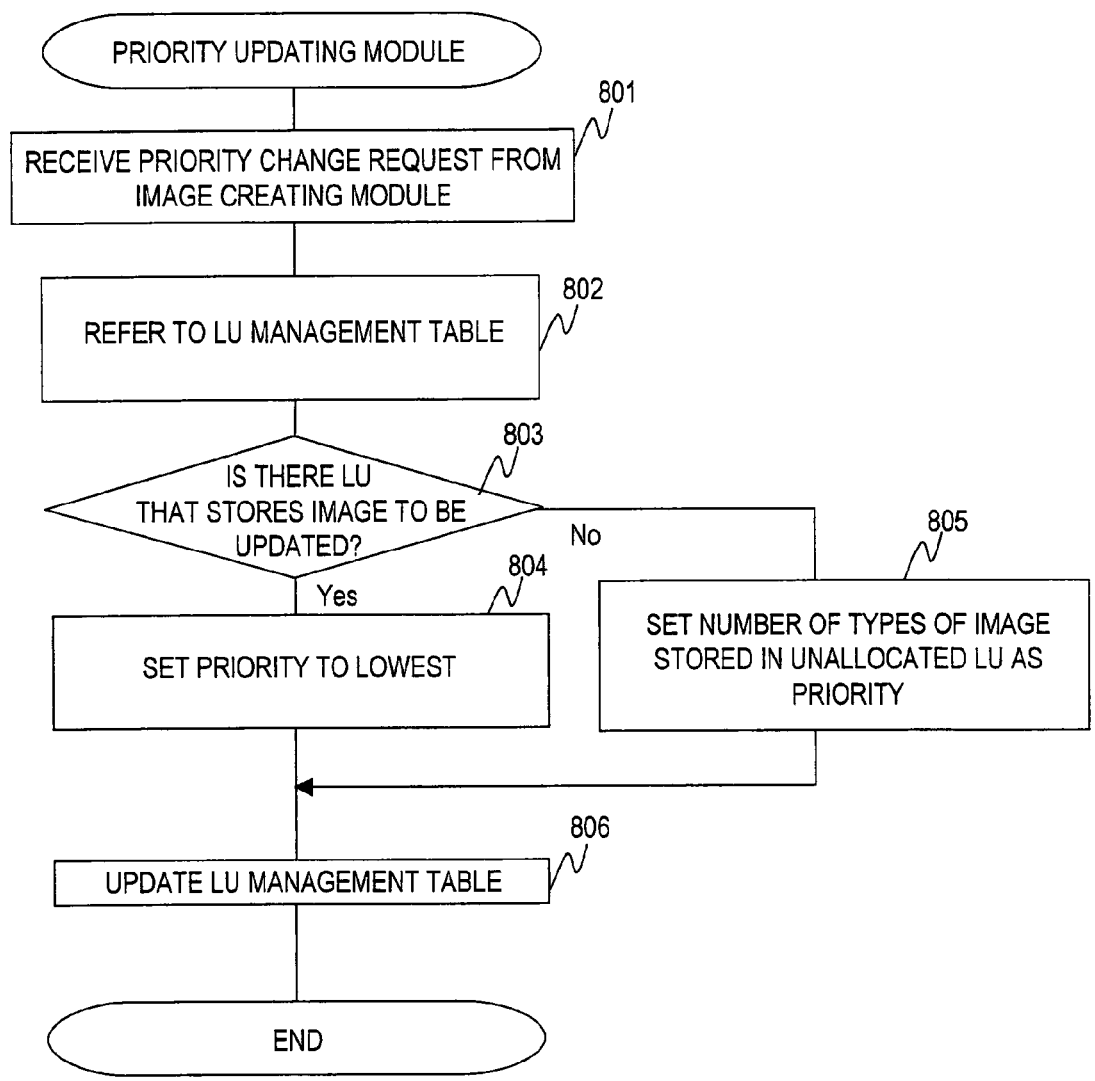
FIG. 17 is a flow chart of processing of a priority updating module according to the first embodiment of this invention.

FIG. 17 is a flow chart of processing of the priority updating module 512 according to the first embodiment of this invention.

A request made by the image creating module 507 to change the order of priority starts the processing (801). As will be described later with reference to FIG. 20, the image creating module 507 requests the priority updating module 512 to change the order of priority after making copies of the LUs 114 that store images.

The LU management table 502 is consulted next (802). From the LU management table 502, records whose image name 702 matches the name of the image for which change of priority is requested (update object image) are retrieved. Then it is judged whether or not the retrieved records include one whose priority 703 is not "−". This enables the module to judge whether or not the disk array system 113 has such LUs 114 that store the update object image and that are not allocated to any server 107 (803).

When such LUs 114 are present, the priority 703 of the LUs 114 that store the update object image is set to a value obtained by adding 1 to the lowest priority 703. In other words, the priority 703 of the LUs 114 that store the update object image is set as the lowest priority level (804). The processing then proceeds to a step S806.

On the other hand, when such LUs 114 are not in the disk array system 113, every record whose priority 703 is not "−" is selected to count the number of types of image written in the field of the image name 702 of the selected records. A value obtained by adding 1 to the counted number of types is set as the priority 703 of the LUs 114 that store the update object image. In other words, the number of types of image stored in the LUs 114 that are not allocated to any server 107 is set as the priority 703 of the LUs 114 that store the update object image (805). The number of image types counts in the update object image.

Then the LU management table 502 is updated (806). Specifically, the identifiers of the LUs 114 that store the update object image are stored as the logical disk number 701. The name of the update object image is entered as the image name 702 of the records in question. Next, the determined priority levels are stored as the priority 703 of these records. Then the storage capacity of the LUs 114 is written in the field of the capacity 704 of these records, completing the processing.

The priority 703 is thus updated in accordance with the LU allocation state, and therefore a high priority can be set as the priority 703 of one of each group of LUs 114 that store the same image.

The priority updating module 512 may change the priority 703 of the LU management table 502 upon request from the console 116. In this case, the priority updating module 512 changes the priority 703 as the request inputted from the console 116 dictates. The priority updating module 512 avoids overlapping when changing the priority 703.

Figure 18:
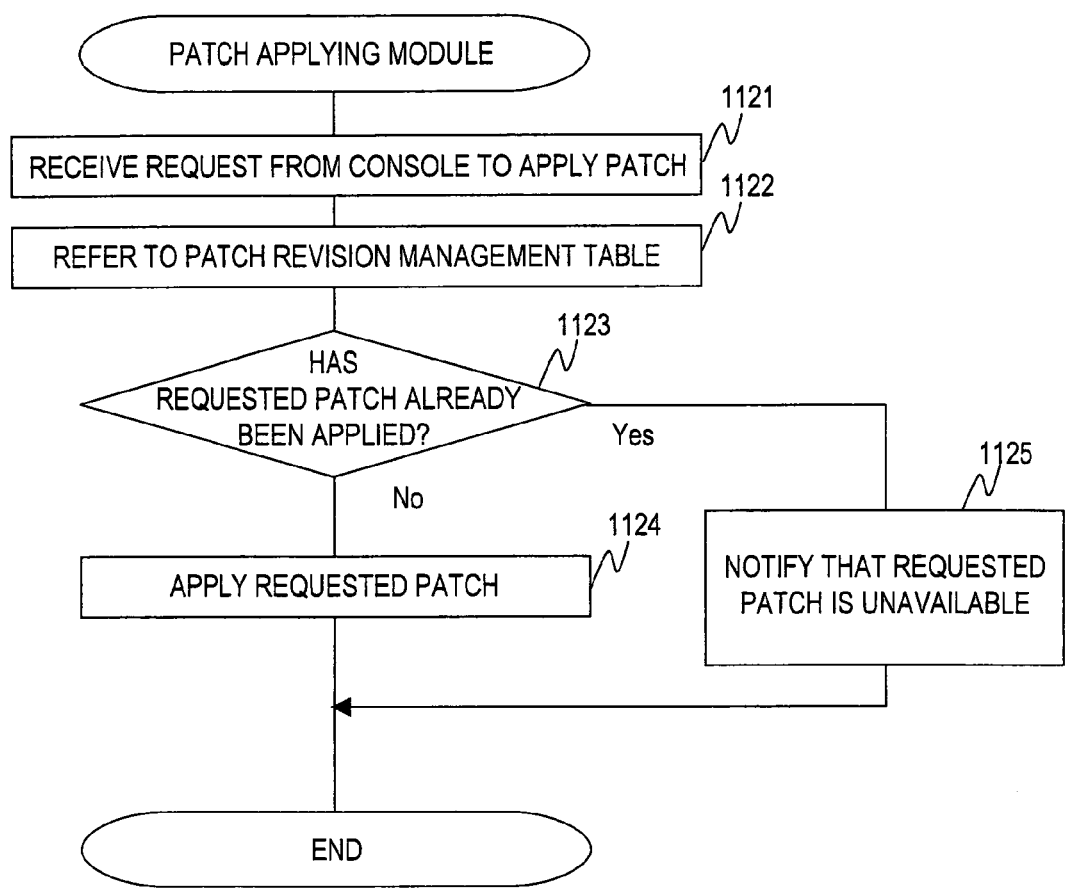
FIG. 18 is a flow chart of processing of a patch applying module according to the first embodiment of this invention.

FIG. 18 is a flow chart of processing of the patch applying module 511 according to the first embodiment of this invention.

The console 116 receives a patch application request inputted by a user, and then requests the patch applying module 511 to apply a patch.

Requested to apply a patch from the console 116, the patch applying module 511 starts this processing (1121).

The patch revision management table 903 is consulted next (1122).

The patch revision management table 903 is searched for a record whose patch revision 1106 matches with a revision of the patch requested to be applied. This is for judging whether the requested patch has already been applied or not (1123).

When the requested patch is not yet be applied, the requested patch is applied to the relevant server 107 (1124). Specifically, copies of the LUs 114 that store contents to which patches are applied are made in advance, and paths are set from these LUs 114 to the servers 107, 107, 107 . . . to apply the patches. In this way, a patch can be applied quickly.

Then the patch revision management table 903 is updated, thereby completing the processing. Specifically, the type of contents to which the patch is applied is registered as the type 1105 of the patch revision management table 903 and a revision of the applied patch is written in the field of the patch revision 1106 of the patch revision management table 903.

When the requested patch has already been applied, on the other hand, the patch applying module 511 notifies the console 116 of the fact (1125) and ends this processing.

Figure 19:
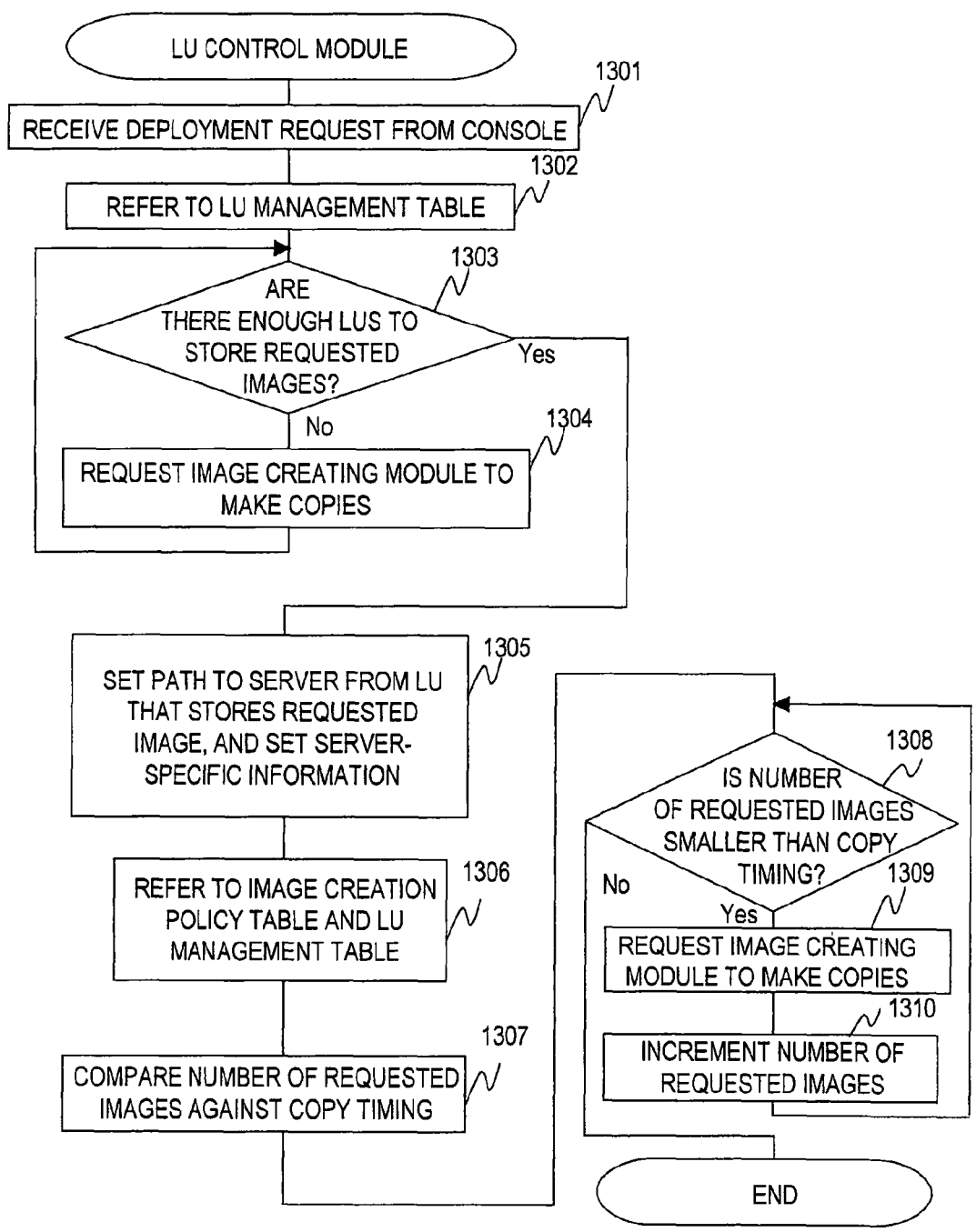
FIG. 19 is a flow chart of processing of an LU control module according to the first embodiment of this invention.

FIG. 19 is a flow chart of processing of the LU control module 504 according to the first embodiment of this invention.

The LU control module 504 receives a deployment request from the console 116 (1301), and then starts the processing. The deployment request contains which image is to be deployed in which server 107.

The LU management table 502 is consulted first (1302).

Next, the LU management table 502 is searched to retrieve records whose image name 702 matches the name of an image to be deployed and choose the record whose priority 703 is not "−" from the LU management table. The number of retrieved records is counted to judge whether or not the number of records counted is equal to or larger than the number of images to be deployed. This is for judging whether or not there are enough LUs 114 to store images to be deployed (1303).

When there are not enough LUs 114 to store images to be deployed, the LU control module 504 requests the image creating module 507 to create copies of the LUs 114 that store images (1304), and the processing returns to the step S1303. The image creating module 507 creates copies of the LUs 114 that store images in a manner that will be described later with reference to FIG. 20.

On the other hand, when there are enough LUs 114 to store images to be deployed, the processing proceeds to a step 1305. In short, the LU control module 504 repeatedly requests the image creating module 507 to create copies until as many LUs 114 as necessary to store images to be deployed are obtained.

Next, the FCA 110 of the servers 107, 107, 107 . . . where images are to be deployed is associated with ports of the FC-SW 105. The ports of the FC-SW 105 are associated with ports of the disk array system 113 and with the LUs 114 that store the images to be deployed. Thus paths are set between the servers 107, 107, 107 . . . and the LUs 114 that store the images to be deployed. The LUs 114 to which the paths are set are mounted to the servers 107, 107, 107 . . . as boot disks. This makes the servers 107, 107, 107 . . . recognize these LUs 114 as boot disks and, accordingly, the servers can be booted up from the LUs.

Then server-specific information is set in a manner that suites the OS of each server 107 (1305) to deploy an image in the server 107. The server-specific information is composed of network settings including an IP address, a computer name, a host name, and the like. To set server-specific information in ways suited to the respective OSs, a file holding server-specific information is overwritten or server-specific information in a file is modified. In the case of an OS where server-specific information is automatically set, there is no need to set server-specific information.

As deployment is completed, the CPU-LU allocation management table 501 and the LU management table 502 are updated.

Specifically, the LU control module 504 retrieves from the CPU-LU allocation management table 501 records whose server identifier 601 matches the identifiers of the servers 107, 107, 107 . . . to which paths are set. The identifiers of the LUs 114 from which the paths are set to these servers 107, 107, 107 . . . are registered as the logical disk number 604 of the retrieved records. Then the identifiers of the ports of the FC-SW 105 that are associated with the servers 107, 107, 107 . . . are registered as the FC connection port number 606 of the retrieved records. The CPU-LU allocation management table 501 is thus updated.

The LU management table 502 is searched to retrieve records whose logical disk number 701 matches the identifiers of the LUs 114 from which the paths are set. The priority 703 of the retrieved records is changed to "–". The LU management table 502 is thus updated.

The LU management table 502 and the image creation policy table 506 are consulted next (1306).

The LU management table 502 is looked up for records whose image name 702 matches the names of the images deployed and whose priority 703 is not "–". The number of the retrieved records is counted.

Next, the copy timing 1202 is extracted from records of the image creation policy table 506 whose image name 1201 matches the names of the images deployed. The extracted copy timing 1202 is compared against the number of the records counted. In other words, the copy timing 1202 is compared against the number of LUs 114 that store the images deployed (1307).

Then the LU control module 504 judges whether or not the number of the LUs 114 that store the deployed image is equal to or smaller than the number indicated by the extracted copy timing 1202 (1308).

When the number of these LUs 114 is equal to or smaller than the number indicated by the extracted copy timing 1202, it means a shortage of copies of the LUs 114 to store the images and the LU control module 504 requests the image creating module 507 to create copies of the LUs 114 to store the images (1309).

The LU control module 504 then increments the number of the LUs 114 that store the deployed images (the number of records counted in the step S1307) (1310), and the processing returns to the step S1308.

When the number of the LUs 114 that store the deployed images exceeds the number indicated by the extracted copy timing 1202, the LU control module 504 judges that there are enough copies of the LUs 114 to store the images and accordingly ends this processing.

In the step S1303 of this processing, the image creating module 507 is repeatedly requested to cretae copies of the LUs 114 that store images until as many LUs 114 as necessary to store the images are obtained. Alternatively, deployment may be finished first for the currently existing LUs 114 before the image creating module 507 is requested to create copies of the LUs 114 in order to remedy the shortage. In this way, deployment can be started as soon as the LUs 114 that store images are copied, which makes the blade server system ready for urgent scale-out.

Figure 20:
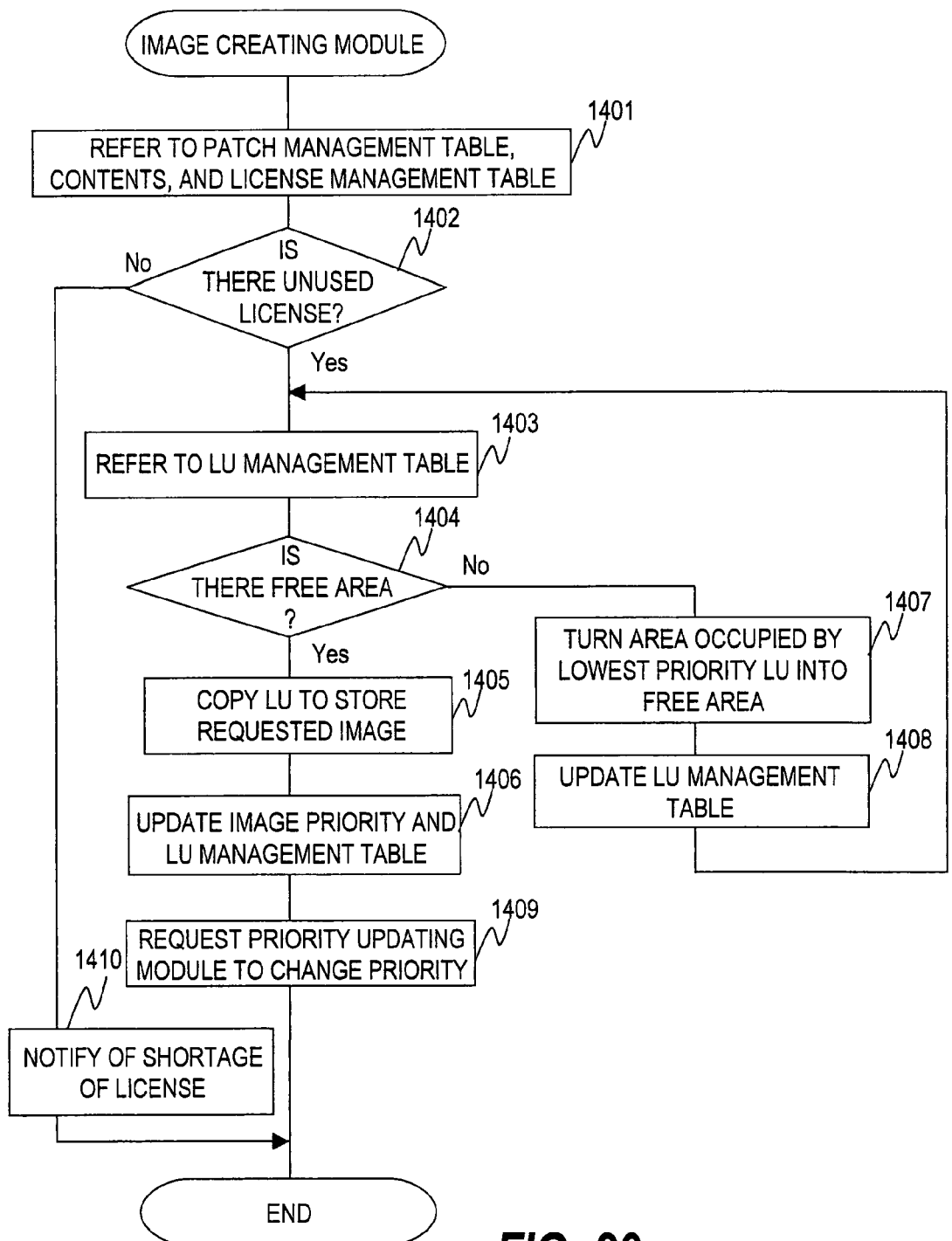
FIG. 20 is a flow chart of processing of an image creating module according to the first embodiment of this invention.

FIG. 20 is a flow chart of processing of the image creating module 507 according to the first embodiment of this invention.

The image creating module 507 receives a request to create copies of the LUs 114 that store images from the LU control module 504 or from the policy updating module 510, and then starts this processing. First, the license management table 901 and the patch management table 902 are consulted (1401).

Whether there is an unused license or not is judged from the tables consulted (1402). Specifically, the contents 1102 are extracted from records of the patch management table 902 whose image name 1101 matches the name of a requested image. A row of the license management table 901 that coincides with the extracted contents 1102 is chosen to extract the unused license 1006 of the chosen row. Then the image creating module 507 judges whether or not "0" is written in the field of the unused license 1006 extracted.

When there is no unused license, the LUs 114 that store the requested image cannot be copied. Accordingly, the image creating module 507 notifies the console 116 of a shortage of license (1410) and terminates the processing.

When there is an unused license, the LU management table 502 is consulted (1403). The capacity 704 is extracted from records of the LU management table 502 whose image name 702 matches the name of the requested image. Then the free capacity value including copies is extracted from the free capacity 706 to judge whether or not the extracted capacity 704 is equal to or larger than the extracted free capacity value including copies. This is for judging whether or not there is an area to which the LUs 114 that store the requested image are to be copied (1404).

When there is no area to which the LUs 114 that store the requested image are to be copied, an area to copy these LUs 114 has to be created. The logical disk number 701 is extracted from a record of the LU management table 502 whose priority 703 is the lowest priority level. The LU that is identified by the extracted logical disk number 701 is deleted to turn the area occupied by this LU into an unoccupied area (1407).

Then the LU management table 502 is updated (1408). Specifically, the LU management table 502 is searched to retrieve a record whose logical disk number 701 matches the identifier of the deleted LU. The capacity 704 of the retrieved record is extracted and, thereafter, the retrieved record is removed from the table. The extracted capacity 704 is added to the free capacity value including copies in the free capacity 706. Also, the extracted capacity 704 is subtracted from the currently used capacity value including copies in the total used capacity 705.

The LU management table 502 is thus updated and the processing returns to the step S1403.

When a free area to copy the LUs 114 that store the requested image is found in the step S1404, copies of the LUs 114 that store the requested image are made (1405).

The LU management table 502 is updated next (1406). Specifically, the identifiers of the LUs 114 that are created by the copying are entered as the logical disk number 701 of the LU management table 502. The name of the image stored in the LUs 114 that are created by the copying is registered as the image name 702 of these records, and the storage capacity of the LUs 114 that are created by the copying is registered as the capacity 704 of these records.

The image creating module 507 then requests the priority updating module 512 to change the priority levels of the LUs 114 that are created by the copying (1409), and ends this processing.

As has been described, the image creating module 507 can create copies of the LUs 114 to store images while managing licenses. The image creating module 507 is also capable of securing a storage area necessary for a service or the like by deleting the LUs 114 of low priority.

Figure 21:
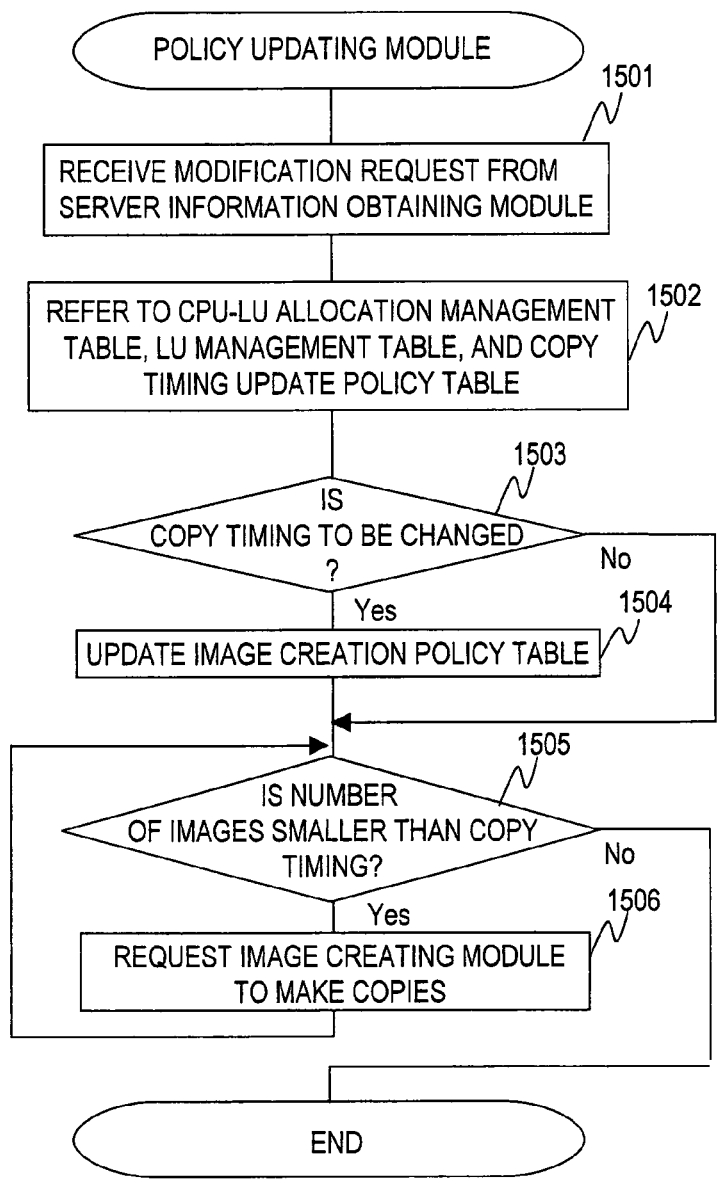
FIG. 21 is a flow chart of processing of a policy updating module according to the first embodiment of this invention.

FIG. 21 is a flow chart of processing of the policy updating module 510 according to the first embodiment of this invention.

The policy updating module 510 receives information on the server 107 from the server information obtaining module 104 (1501), and then starts the processing. The server information obtaining module 104 obtains, as will be described later with reference to FIG. 22, information from the server 107 and sends the obtained information on the server 107 to the policy updating module 510.

The CPU-LU management allocation table 501, the LU management table 502, and the copy timing update policy table 508 are consulted first (1502).

The CPU-LU management allocation table 501 is searched to extract the logical disk number 604 of records whose server identifier 601 matches the identifier of the server 107 of which information is obtained. The LU management table 502 is then looked up to extract the image name 702 of records whose logical disk number 701 matches the extracted logical disc number 604.

Next, the copy timing update policy table 508 is searched to retrieve records whose image name 1204 matches the extracted image name 702. The copy timing set value 1206 that corresponds to the obtained information on the server 107 is extracted from the retrieved records.

The image creation policy table 506 is searched to extract the copy timing 1202 of records whose image name 1201 matches the extracted image name 702. The policy updating module 510 then judges whether the extracted copy timing set value 1206 coincides with the extracted copy timing 1202 or not. This is for judging whether the copy timing 1202 of the image creation policy table 506 needs to be changed or not (1503).

When there is no need to change the copy timing 1202, the processing proceeds to a step S1505.

On the other hand, when the copy timing 1202 needs to be changed, the image creation policy table 506 is updated by writing the extracted copy timing set value 1206 in the field of the copy timing 1202 of the image creation policy table 506 (1504).

Next, the LU management table 502 is searched to retrieve every record whose image name 702 matches the image name 702 that is extracted in the step S1503 and whose priority 703 is not "–". The number of the retrieved records is counted, and the policy updating module 510 judges whether or not the number of the records counted is equal to or smaller than the number indicated by the updated copy timing 1202. In other words, the policy updating module 510 judges whether or not the number of the LUs 114 that store the image in question is equal to or smaller than the number indicated by the updated copy timing 1202 (1505).

When the number of the records counted is equal to or smaller than the number indicated by the copy timing 1202, it means a shortage of copies of the LUs 114 that store the image. The policy updating module 510 therefore requests the image creating module 507 to create copies of the LUs (1506), and the processing returns to the step S1505.

When the number of the records counted exceeds the number indicated by the copy timing 1202, there are enough copies of the LUs 114 that store the image and accordingly this processing is ended.

The policy updating module 510 thus can change the image creation policy table 506. This makes the blade server system of this embodiment ready for a sudden change in load of the server 107.

Figure 22:
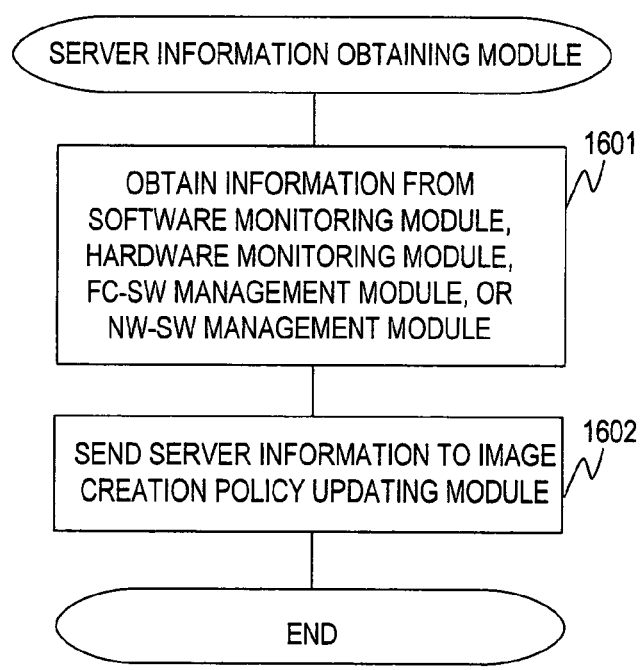
FIG. 22 is a flow chart of processing of a server information obtaining module according to the first embodiment of this invention.

FIG. 22 is a flow chart of processing of the server information obtaining module 104 according to the first embodiment of this invention.

The server information obtaining module 104 obtains, at given intervals, information on the server 107 from the software monitoring module 214, the FC-SW monitoring module 112, or the NW-SW management module 111. When a failure occurs in the server 107, the server information obtaining module 104 obtains failure information of the server 107 from the hardware monitoring module 301 in the BMC 109 (1601).

The obtained server information is then sent to the image creation policy updating module 510 (1602), and the processing is ended.

The server information obtaining module 104 thus can obtain various types of information on the server 107. This enables the blade server system of this embodiment to detect the load and failure of the server 107, and makes automatic copying of the LUs 114 that store images possible, thereby saving a user from the trouble of making copies manually.

(Second Embodiment)

A second embodiment of this invention shows an example of using rolling update to apply a patch to the server 107 that is providing a service (the server 107 that is in operation). With rolling update, a patch program is applied without seemingly stopping the OS of each server 107 viewed from client computers.

A blade server system of the second embodiment is the same as that of the first embodiment except for processing of the patch applying module 511.

Figure 23:
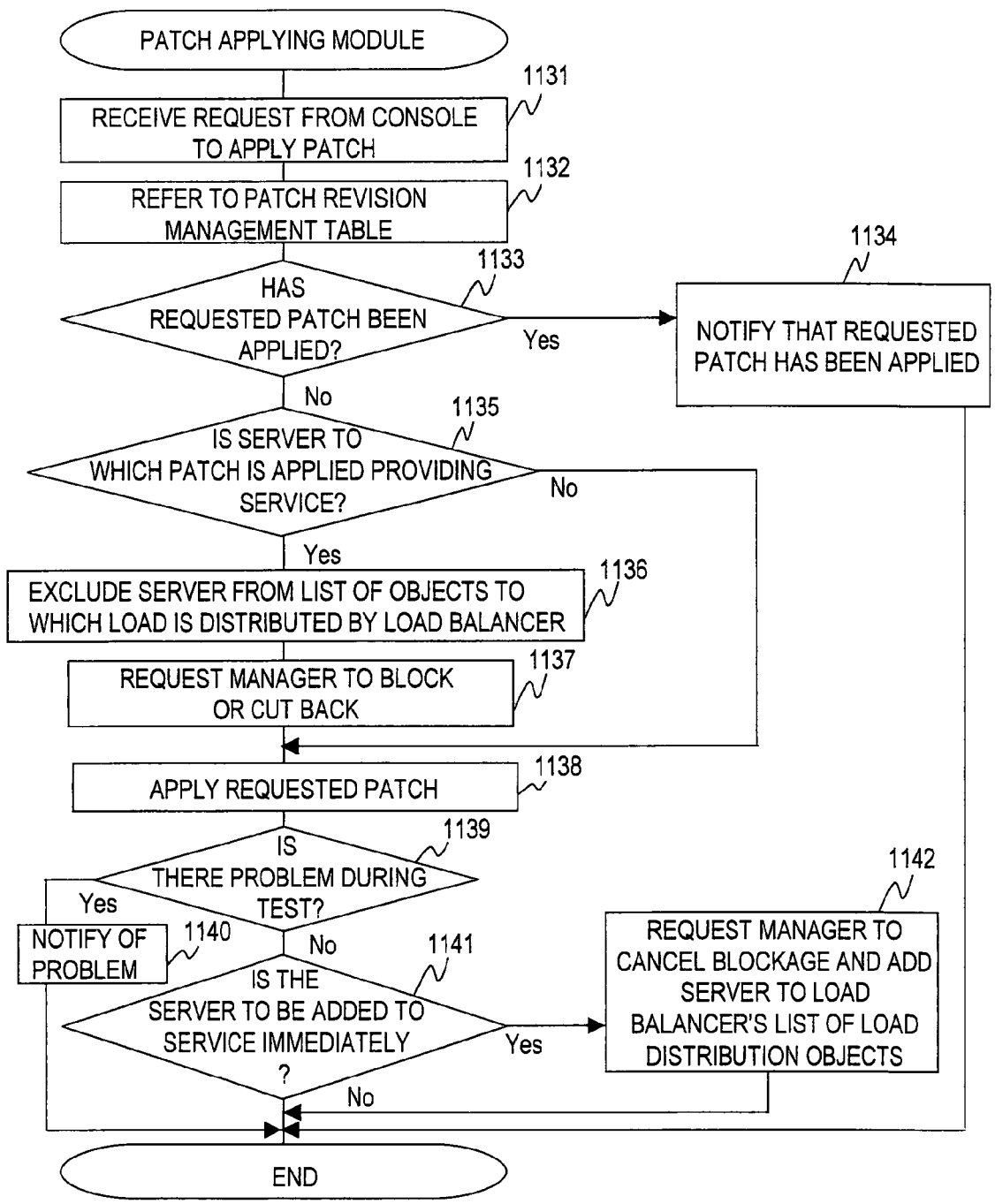
FIG. 23 is a flow chart of processing of a patch applying module according to a second embodiment of this invention.

FIG. 23 is a flow chart of processing of the patch applying module 511 according to the first embodiment of this invention.

Requested to apply a patch from the console 116, the patch applying module 511 starts this processing (1131).

The patch revision management table 903 is consulted next (1132). The patch revision management table 903 is searched for a record whose patch revision 1106 matches a revision of the patch requested to be applied. This is for judging whether the requested patch has already been applied or not (1133).

When the requested patch has already been applied, on the other hand, the patch applying module 511 notifies the console 116 of the fact (1134) and ends this processing.

When the requested patch is yet to be applied, the CPU-LU allocation management table 501 is searched to extract the logical disk number 604 of records whose server identifier 601 matches the identifier of the server 107 to which the requested patch is to be applied. The patch applying module 511 then judges whether or not a value is registered in the field of the extracted logical disk number 604. This is for judging whether or not the server 107 to which the patch is to be applied is providing service (1135). Alternatively, whether the server 107 to which the patch is to be applied is providing a service or not may be judged by obtaining, from the software monitoring module 214, the active or inactive state of the contents in the server 107 to which the patch is to be applied.

When this server 107 is not providing a service, the patch can be immediately applied to the server 107 and the processing proceeds to a step S1138.

When the server 107 to which the patch is to be applied is providing a service, the patch cannot be applied to the server 107 and the server 107 is removed from the list of objects to which load is distributed by the load balancer (1136). This prevents the load balancer from distributing a service to the server 107 to which the patch is to be applied.

Next, a manager in the management server 101 that manages middleware or an application in the server 107 to which the patch is to be applied is requested to block or cut back the middleware or the application (1137). The term "blockage" refers to issuing a service stop request to the server to be managed. The term "cut back" refers to removal of the server from management by the manager after blockage. When blockage or cut back is requested, the middleware or application to which the request is directed stops providing the service.

The patch applying module 511 applies the requested patch to the server 107 (1138). Then the patch revision management table 903 is updated. Specifically, the type of the contents to which the patch is applied is entered as the type 1105 and a revision of the applied patch is written in the field of the patch revision 1106.

Next, the server 107 to which the patch is applied is caused to execute a test program. Results of executing the test program is received from the server 107 to which the patch is applied. The patch applying module 511 then judges, from the received execution results, whether or not something is wrong with the server 107 to which the patch is applied (1139).

When there is a problem in this server 107, the patch applying module 511 notifies the console 116 of the problem (1140).

When there is no problem in the server 107 to which the patch is applied, the patch applying module 511 judges whether or not the server 107 should be added to services immediately (1141).

When the server is not to be added immediately, this processing is ended. On the other hand, when the server is to be added immediately, the manager in the management server 101 is requested to cancel the blockage, or perform scale-out, of the middleware or the application in the server 107 to which the patch is applied. The patch applying module 511 then adds the server 107 to which the patch is applied to the load balancer's list of load distribution objects (1142), and ends this processing.

As has been described, the patch applying module 511 of this embodiment can apply a patch to the server 107 irrespective of whether the server is providing a service or not.

The above embodiments show examples of applying this invention to a blade server system, but this invention is applicable to any computer system that manages plural servers, such as a cluster server or a virtual computer which performs logical partitioning.

While the present invention has been described in detail and pictorially in the accompanying drawings, the present invention is not limited to such detail but covers various obvious modifications and equivalent arrangements, which fall within the purview of the appended claims.

What is claimed is:

1. A deployment method for a server system that comprises a storage system having logical disks storing disk images to be masters and a plurality of servers connected to the storage system via a network, the deployment method comprising the steps of:

holding, by a deploy management module, disk image information to manage identifiers of the logical disks in the storage system, identifiers for identifying the disk images stored in the logical disks, and capacities the logical disks and management information on the number of disk images to manage the number of disk images;

referring to, by the deploy management module, the disk image information and the management information on the number of disk images upon receipt of a command requesting deployment of a specified disk image to obtain the number of specific disk images from the disk image information;

copying, by the deploy management module, the specific disk image to a free area of the storage system in a case where the obtained number of the specific disk images is smaller than the value in the management information on the number of disk images; and updating, by the deploy management module, the disk image information in a case where at least one of the disk images held in a plurality of areas in the storage system is copied to the free area.

2. A deployment method according to claim 1, wherein, in the step of referring to the disk image information and the management information on the number of disk images, the management information on the number of disk images indicates the required number of disk images for a specified timing.

3. A deployment method according to claim 2, wherein the management information on the number of disk images includes update policies associated with the disk images and resource information on resources using the disk images and the deploy management module obtains the resource information to update the management information on the number of disk images.

4. A deployment method according to claim 3, wherein the deploy management module maps copies of the disk images to the plurality of servers before receiving the command requesting the deployment, each of the disk images includes an OS, and the deploy management module sets unique information to the disk image.

5. A server system comprising:

a storage system having logical disks storing disk images to be masters;

a plurality of servers connected to the storage system via a network; and a deploy management module for deploying the disk images to the plurality of servers, wherein the deploy management module:

holds disk image information to manage identifiers of the logical disks in the storage system, identifiers for identifying the disk images stored in the logical disks, and the logical disks and management information on the number of disk images to manage the number of disk images;

refers to, by the deploy management module, the disk image information and the management information on the number of disk images upon receipt of a command requesting deployment of a specified disk image to obtain the number of specific disk images from the disk image information;

copies the specific disk image to a free area of the storage system in a case where the obtained number of the specific disk images is smaller than the value in the management information on the number of disk images; and updates, by the deploy management module, the disk image information in a case where at least one of the disk images held in a plurality of areas in the storage system is copied to the free area.

6. A server system according to claim 5, wherein, when the deploy management module refers to the disk image information and the management information on the number of disk images, the management information on the number of disk images indicates the required number of disk images for a specified timing.

7. A server system according to claim 6, wherein the management information on the number of disk images includes update policies associated with the disk images and resource information on resources using the disk images and the deploy management module obtains the resource information to update the management information on the number of disk images.

8. A server system according to claim 7, wherein the deploy management module maps copies of the disk images to the plurality of servers before receiving the command requesting the deployment, each of the disk images includes an OS, and the deploy management module sets unique information to the disk image.

9. A non-transitory computer readable storage medium storing a program for deploying disk images to a plurality of servers in a server system that comprises a storage system having logical disks storing the disk images to be masters and the plurality of servers connected to the storage system via a network, the program causing a computer to execute the steps of:

holding disk image information to manage identifiers of the logical disks in the storage system, identifiers for identifying the disk images stored in the logical disks, and the logical disks and management information on the number of disk images to manage the number of disk images;

referring to, by the deploy management module, the disk image information and the management information on the number of disk images upon receipt of a command requesting deployment of a specified disk image to obtain the number of specific disk images from the disk image information;

copying the specific disk image to a free area of the storage system in a case where the obtained number of the specific disk images is smaller than the value in the management information on the number of disk images; and updating, by the deploy management module, the disk image information in a case where at least one of the disk images held in a plurality of areas in the storage system is copied to the free area.

10. A non-transitory computer readable storage medium according to claim 9, wherein, in the step of referring to the disk image information and the management information on the number of disk images, the management information on the number of disk images indicates the required number of disk images for a specified timing.

11. A non-transitory computer readable storage medium according to claim 10, wherein the management information on the number of disk images includes update policies associated with the disk images and resource information on resources using the disk images and the deploy management module obtains the resource information to update the management information on the number of disk images.

12. A non-transitory computer readable storage medium according to claim 11, wherein the deploy management module maps copies of the disk images to the plurality of servers before receiving the command requesting the deployment, each of the disk images includes an OS, and the deploy management module sets unique information to the disk image.

* * * * *